Nov. 15, 1960 V. H. HUGO ET AL 2,959,945
SPRING LOADED ROTARY CLUTCHING MECHANISM
Filed April 16, 1959 2 Sheets-Sheet 1
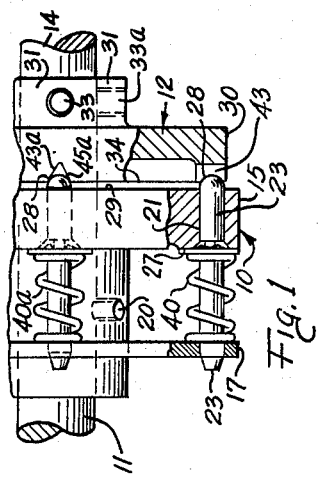
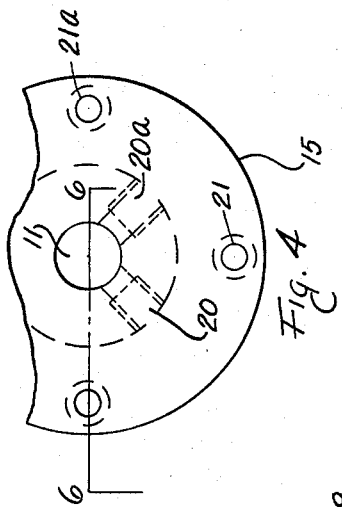
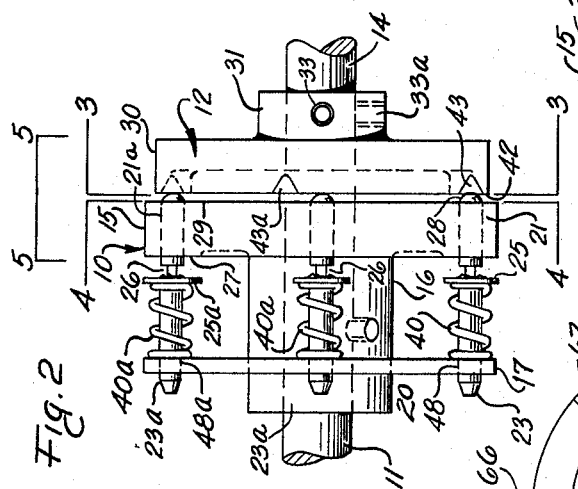
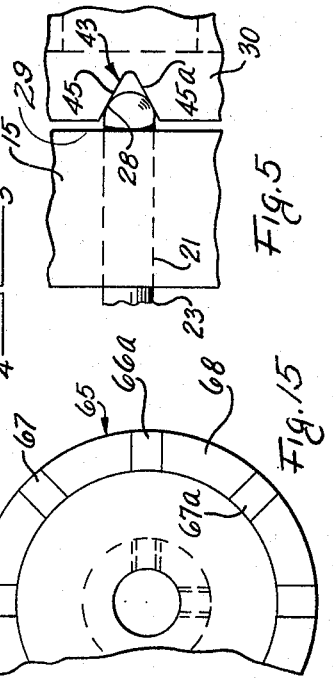
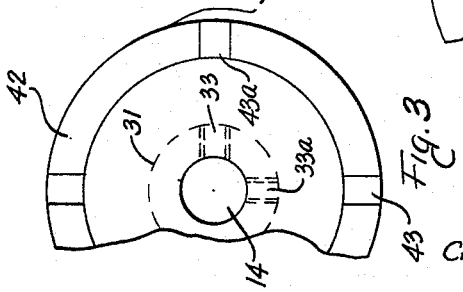
VICTOR H. HUGO
CHARLES DORCSJAK
INVENTOR.
ATTORNEY

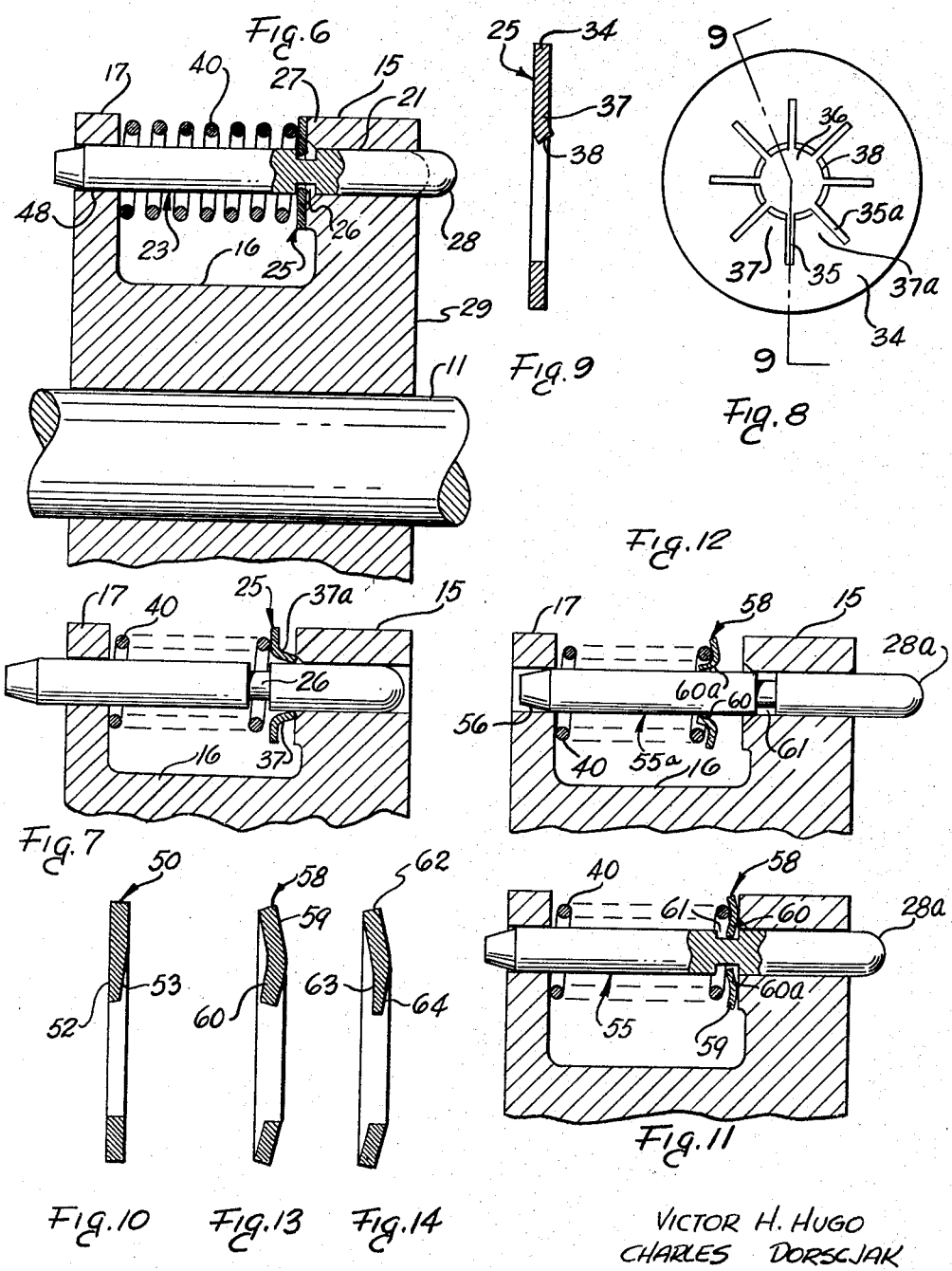

United States Patent Office 2,959,945
Patented Nov. 15, 1960

2,959,945

SPRING LOADED ROTARY CLUTCHING MECHANISM

Victor Henry Hugo, 563 W. Westfield Ave., Roselle Park, N.J., and Charles Dorcsjak, 1555 Raritan Road, Clark, N.J.

Filed Apr. 16, 1959, Ser. No. 806,807

10 Claims. (Cl. 64—29)

This invention relates to clutches which are used for driving rotating machinery, and a particularly directed to a spring loaded clutching mechanism, which is so constructed that it will slip to some degree when the drive mechanism is loaded beyond a predetermined degree.

It is primarily directed to a clutching mechanism, which is spring loaded in such a manner that the load the clutching mechanism will transmit is controllable.

Another feature of the clutching mechanism is that if a load beyond that for which the clutching mechanism is set, is imposed on the driven end of the clutch, the driving end will be moved through a relatively small rotational angle, relative to the driven end, thereby allowing the driving elements of the clutching mechanism to slide freely relative to the driven member, after which the driven member will again be gripped and driven by the driving member in the same manner and to substantially the same degree as at the initial setting.

Another feature of the clutch construction is that the multiple gripping mechanism provided uniformly grips the driven member, thus equalizing the loads on the individual gripping members, as far as possible.

A major feature of the construction is that the individual gripping members, or drive pins of the clutching mechanism may individually be replaced, if they become excessively worn, or damaged for any reason, without interfering with the operation or setting of the remaining gripping members or pins.

An essential feature of the clutching mechanism is that the clutching mechanism can be utilized over a wide range of operating speeds and loads, the essentials of the construction remaining substantially the same.

Another feature of the clutch construction is that the load on the individual springs used in conjunction with each gripping member, or drive pin can be varied and adjusted to modify the nominal operating load, which the clutching mechanism will sustain, and the load at which the gripping mechanism or drive pins will slip to some extent, to avoid damage to other parts of the clutch operating mechanism.

Another feature of the construction is that essentially the same type of clutching mechanism can be produced in a wide range of sizes and types, to operate under a wide range of loads, speeds and operating conditions.

Another feature of the clutching mechanism is that the load under which the clutching mechanism operates can be revised by changing the springs, and other interchangeable parts of the clutching mechanism the parts attached to the driving and driven mechanism remaining in substantially their original form.

Another major advantage of applicants' construction is that the clutching mechanism can readily be attached to and removed from the shafts of both the driving and driven members, without disturbing the driving and driven members, and by the use of conventional hand tools.

The accompanying drawings, illustrative of one embodiment of the invention, and a modification thereof, together with the description of their construction and the method of operation, adjustment and utilization thereof, will serve to clarify further objects and advantages of the invention.

In the drawings:

Fig. 1 represents a front elevational view of one embodiment of the clutching mechanism in its operating position, with the spring loaded drive pins in engagement with the radially positioned grooves in the driven disc.

Fig. 2 is a front elevational view, similar to Fig. 1, of the clutching mechanism, shown in Fig. 1, with the clutch in a slipping position with the ends of the driving pins in contact with the flat face of the driven disc.

Fig. 3 is a side elevational view of the driven disc shown in Fig. 2, showing the driving grooves therein, and the method of attaching the driven disc to the driven shaft, the view being taken on the line 3—3, Fig. 2.

Fig. 4 is a side elevational view, similar to Fig. 3, showing the driving pins projecting through the driving disc and the method of attaching the driving disc to the drive shaft, taken on the line 4—4, Fig. 2.

Fig. 5 is an enlarged top elevational view, similar to Fig. 1, showing one of the spring-loaded drive pins in operating engagement with one of the radial grooves through the driven disc, taken on the line 5—5, Fig. 2.

Fig. 6 is an enlarged vertical section through the driving member and one of the drive pins, shown in Figs. 1 and 2, with the drive pin shown in the driving position, similar to that shown in Fig. 1, the section being taken on the line 6—6, Fig. 4.

Fig. 7 is an enlarged vertical section, similar to that shown in Figs. 1 and 6, with the pin and snap washer shown during the process of insertion of the pin through the central opening through the snap washer.

Fig. 8 is an enlarged side elevational view of one embodiment of the snap spring washer, such as that shown in Fig. 6, with the central radial prongs extended in the manner shown in Fig. 6.

Fig. 9 is an enlarged section through the snap washer shown in Figs. 2, 6 and 8, taken on the line 9—9, Fig. 8.

Fig. 10, is an enlarged section, similar to Fig. 9, through a modification of the snap washer shown in Figs. 8 and 9, showing one face of the radial prongs of the washer bevelled, to facilitate insertion of the prongs into the circular groove in the drive pin, shown in Fig. 6.

Fig. 11 is an enlarged vertical section, similar to Fig. 6, through a modification of the drive pin construction shown in Fig. 6, with the drive pin shown in its driving position, similar to that shown in Figs. 1 and 6.

Fig. 12 is an enlarged vertical section, similar to Fig. 7, through the modified drive pin shown in Fig. 11, with the drive pin and the snap washer shown in an intermediate position during the process of insertion of the drive pin into the drive member, through the central opening through the snap washer.

Fig. 13 is an enlarged section, similar to Fig. 9, through the modified snap washer shown in Figs. 11 and 12, the section being taken on a line similar to 9—9, Fig. 8.

Fig. 14 is an enlarged vertical section, similar to Fig. 13, through the modified snap washer shown in Fig. 13, with one face of the radial prongs of the washer bevelled in a manner similar to that shown in Fig. 10, to facilitate insertion of the prongs into the circular groove around the modified drive pin shown in Fig. 11.

Fig. 15 is a side elevational view, similar to Fig. 3, of a modification of the driven disc, shown in Fig. 3, with the number of grooves in the face thereof increased, taken on a line similar to 3—3, Fig. 2.

It will be understood that the following description of the construction and the method of operation and utilization of the spring loaded clutching mechanism, is intended as explanatory of the invention and not restrictive thereof.

In the drawings, the same reference numerals designate the same parts throughout the various views, except where otherwise indicated.

One embodiment of the construction, shown in Figs. 1 and 2, comprises essentially a driving section 10, which is attached to and driven by a drive shaft 11, and a driven plate 12, which is driven by the driving section in a manner hereinafter described, the driven plate being fixedly attached to a driven shaft 14.

The driving section 10 of the clutching mechanism consists of a driving disc 15 of substantially cylindrical form, with a tubular sleeve 16 integral with the driving disc and extending outward therefrom, and a relatively thin pin support disc 17 integral with the end of the sleeve, opposite the driving disc 15, and substantially parallel to the driving disc, the driving disc and the drive pin support disc being co-axial with the tubular sleeve 16.

A substantially cylindrical drive shaft 11 is fitted through a central opening through the tubular sleeve 16, the tubular sleeve 16 and the other parts of the driving section 10 being locked to the drive shaft 11 by a plurality of set screws 20, 20a, such as those shown in Fig. 4, or by means of a key, or other suitable attaching means.

The driving disc 15 has a plurality of equally-spaced substantially circular openings 21, 21a therethrough, the openings being substantially parallel to the longitudinal axis of the driving disc 15, and the tubular sleeve 16 with which the driving disc is integral.

Each of the openings through the driving disc 15 and the mating pin support disc 17 has a substantially cylindrical drive pin 23, 23a extending therethrough, the drive pin 23, 23a being retained in its driving position, such as that shown in Figs. 1 and 6, by a snap spring washer 25, the inner portion of which fits into a substantially circular groove 26, surrounding the drive pin, as shown in Figs. 1, 2 and 6, one face of the snap spring washer 25, in the driving position shown in Figs. 1 and 6, engaging a substantially circular face ring 27, integral with the driving disc.

A portion of each drive pin 23, 23a extends beyond the flat face of the driving disc, toward the driven plate 12, a tip 28 of hemi-spherical or other arcuate form being integral with the free end of each of the drive pins 23, 23a, and projecting beyond the face of the driving disc.

The tip 28 of each of the drive pins, which is of hemispherical, spherical segmental form, or of other arcuate cross-sectional contour, projects through the face 29 of the driving disc, which is directed toward the driven plate 12. The driven plate 12 comprises a substantially cylindrical disc section 30, with a hollow hub 31 of cylindrical form, and of a smaller diameter than the driven disc integral with and projecting outward from the driven disc 30. The hub 31 of the driven disc has a substantially circular opening therethrough, co-axially therewith, the driven shaft 14 being inserted through the opening, the hub 31 of the driven disc being locked to the driven shaft by a plurality of radially positioned set screws 33, 33a, or other suitable locking means.

Each of the drive pins 23, 23a in the driving position shown in Figs. 1 and 6 is laterally located by a snap spring washer 25, such as that shown in Fig. 6, the snap washer being held in place by an annular groove 26 of rectangular, or other suitable contour, which is cut into the cylindrical surface of each drive pin, in substantially the longitudinal position shown in Fig. 6.

Each snap spring washer 25, such as that shown in Figs. 8 and 9, consists of a relatively flat outer section 34 of substantially cylindrical form, a plurality of equally-spaced radially positioned slots 35, 35a cut around the central opening 36 through the washer, forming a plurality of equally-spaced radially positioned prongs 37, 37a, such as those shown around the central opening in Figs. 6, 8 and 9, the inner edge 38 of each of the prongs 37, 37a projecting beyond the flat face of the snap washer 25 along an arcuate line, such as that shown in Fig. 9. A coiled compression spring 40, 40a is inserted around each drive pin 23, 23a, between the inner face of the pin support disc 17 and the adjacent face of the snap spring washer 25, each spring 40, 40a retaining one face of each snap spring washer in engagement with the circular rim 27 of the driving disc 15 in the driving position, shown in Figs. 1 and 6.

In order to insert the drive pins 23, 23a into the driving position, shown in Figs. 1 and 6, each of the drive pins 23, 23a is inserted through the mating opening through the pin support disc 17, the cylindrical portion of each drive pin 23, 23a being forced through the central opening 36 through the snap spring washer 25, until the prongs 37, 37a of each snap washer are moved outward into a position substantially as shown in Fig. 7, the inner surface of each prong 37, 37a, engaging the cylindrical outer surface of the drive pin.

In this position, the groove 26 around the outer circumference of each drive pin is located a distance from the face of the snap washer, the exact distance depending upon the extent to which the drive pin is inserted through the snap washer 25.

After each drive pin passes the position, such as that shown in dot-dash lines in Fig. 6, in which the hemispherical tip 28 of the drive pin is close to the open face of the driving disc 15, the circular groove 26 around each drive pin 23, 23a reaches a position, such as that shown in Fig. 6, in which the circular groove around the drive pin is in substantial axial alignment with the prongs 37, 37a of the snap washer 25.

In this position, the inner edge 38 of the prongs 37, 37a of the snap washer 25 drop into the circular groove around the drive pin in substantially the position shown in Fig. 6, the compression spring 40, 40a forcing the snap washer 25 into engagement with the rim 27 of the driving disc 30, the tip 28 of the drive pin projecting beyond the face 29 of the driving disc into substantially the driving position shown in Fig. 6, which is substantially the same as that shown in Fig. 1.

The portion of the driven disc which faces the driving disc 15 has an annular ring face section 42, integral therewith, on the face thereof directed toward the driving disc, the ring face section 42 having a plurality of equally-spaced, radially positioned grooves 43, 43a therethrough, the angular spacing between the grooves 43, 43a being substantially equal to that of the angular spacing between the drive pins 23, 23a, so that each groove 43, 43a is accurately radially aligned with the arcuate tip 28 of one of the drive pins 23, 23a.

While four equally-spaced circular openings 21, 21a are shown through the driving disc 15 and four drive pins 23, 23a fitted thereto, the number of driving disc openings, and therefore the number of drive pins employed is equal to the number of radial grooves through the ring face of the driven disc, thus accurately aligning the tip of one drive pin with the center of each of the radial grooves 43, 43a through the driven disc.

Each of the radial grooves 43, 43a, which extends radially over the entire width of the ring face of the driven disc 30, is formed of two angularly positioned flat faces 45, 45a, located in a substantially V-section, the angle between the two flat faces 45, 45a of each groove being established to conform to the contour of the arcuate tip 28 of the drive pin. In the construction shown in Figs. 2, 5, and 6, the tip 28 of each drive pin is of hemi-spherical form, the included angle between the flat faces 45, 45a of each groove 43, 43a being approximately 60°, so that both angular faces of the groove engage the surface of the tip of the drive pin at uniformly longitudinally positioned points, relative to the face of the driven disc.

The angles between the longitudinal axis of each drive pin 23, 23a and the two faces 45, 45a of each groove 43, 43a converge at substantially the same point, so that both flat faces of each groove engage the tip of the corresponding drive pin at substantially the same distance from the flat face of the ring section of the driven disc 30.

A thin substantially circular clamping or pin support disc 17 is integral with the outer end of the tubular sleeve section 16 of the driving section 10, a series of openings 48, 48a through the pin support disc, which are aligned with the mating openings 21, 21a through the driving disc 15, receiving and supporting the cylindrical portion of each drive pin located adjacent the extreme outer end of the drive pin, to enable the drive pins 23, 23a to slide freely relative to the clamping or pin support disc, when the drive pins are inserted into the driving position shown in Fig. 6, in the manner hereinbefore described.

A coiled compression spring 40, 40a which is formed of circular spring wire, wire of square cross-section, or other suitable type of spring wire, is fitted around each of the drive pins 23, 23a, the ends of each compression spring being clamped between the pin support disc 17 and one face of the snap spring washer 25, fitted to the corresponding drive pin 23, 23a, as shown in Fig. 6, the compression springs forcing the drive pins through the openings through the driving disc 15, thereby forcing the tips 28 of the drive pins into the V-shaped grooves 43, 43a of the driven disc.

The load on all of the compression springs 40, 40a around the drive pins 23, 23a is held relatively uniform, thereby maintaining relatively uniform pressure on all of the drive pins 23, 23a, and in that manner equalizing the pressure between the tips 28 of the drive pins 23, 23a and the angular faces of the grooves 43, 43a in the face of the driven disc to which they are fitted.

Fig. 10 shows a snap spring washer 50 which is a modification of that shown in Figs. 8 and 9. The side elevational view of the snap washer is substantially the same as that shown in Fig. 8, the radially positioned slots and the prongs 52 formed thereby being substantially the same.

One face of each prong of the snap washer is sloped 53, as shown in Fig. 10, from the inner edge of the prong, to a point near the outer end of the adjacent slot to reduce the thickness of the prongs at the point which enters the circular groove 26 around the drive pin 23, 23a.

This facilitates the entrance of the prongs of the snap washer into the groove 26 around the drive pins, when the drive pin approaches the driving position shown in Fig. 6.

As the thickness of the inner portion of the prongs 37, 37a of the snap washer is reduced, the pressure required to move the drive pin through the snap washer 25, while the prongs 37, 37a thereof are in the displaced position shown in Fig. 7, is reduced, thereby facilitating the insertion of each drive pin 23, 23a into the corresponding snap washer 25.

Figs. 11, 12, 13 and 14 show another modification of the construction of the drive pin, spring, and snap washer combination shown in Figs. 6 and 7.

In this construction, the diameter and relative positions of the drive pins 55, 55a are substantially the same as those shown in Figs. 1, 2, 6 and 7. Each drive pin 55, 55a has a frusto-conical end 56, which is located opposite the hemi-spherical tip thereof.

The snap washer 58 shown in Figs. 11, 12 and 13 is similar to that shown in Figs. 6, 7 and 9, except the circumferential outer portion 59 of the snap washer is sloped inward from the face of the rim 27 of the driving disc to the outer circumference of the snap washer. The inner portion of the snap washer 58 surrounding the central opening therethrough is also sloped relative to the flat face of the rim 27 of the driving disc, in an angular direction opposite that of the outer portion thereof.

The radial slots through the inner portion of each snap spring washer are substantially the same as those shown in Fig. 8, the radial slots forming a plurality of equally-spaced radial prongs 60, 60a, which are substantially the same as those shown in Figs. 8 and 9, except that they are sloped relative to the nominal face of the washer as shown in Fig. 13, thereby forming a dished washer in the assembled position as shown in Figs. 11 and 13, the prongs 60, 60a fitting into the circular groove 61 surrounding each drive pin in the driving position shown in Fig. 11. The coiled compression spring 40, 40a is also the same as that shown in Figs. 6 and 7, and is located in substantially the same position relative to the tip of the drive pin as that shown in Fig. 6.

In order to insert the modified drive pin 55 into each modified snap spring washer 58, the compression spring 40, 40a and the snap washer 58 are inserted between the driving disc 15 and the pin support disc 17 in substantially the same position as that shown in Fig. 11. The frusto-conical end 56 of the drive pin 55, 55a is inserted through the central opening in the snap washer 58, thereby displacing the prongs 61 of the snap washer from their normal position shown in Fig. 13, to their displaced position shown in Fig. 12, the inner surfaces of the prongs 60, 60a being in engagement with the outer circumference of the corresponding drive pin 55.

The drive pin 55, 55a is forced along through the snap washer 58, until the frusto-conical end 56 of the drive pin enters the opening through the pin support disc 17, as shown in Fig. 12, the snap washer 58 being moved along with the drive pin 55, 55a, until the compression spring pressure is substantially equal to the manual pressure exerted against the drive pin 55, the longitudinal movement of the drive pin continuing until the circular groove 61 surrounding the drive pin is in substantial alignment with the prongs 60, 60a of the washer, after which the prongs 60, 60a of the washer drop radially into the circular groove 61, the spring 40, 40a forcing the drive pin 55 back into the clamping position, as shown in Fig. 11, with the tip of the drive pin projecting beyond the face of the driving disc a distance substantially equal to that shown in Fig. 6.

In another modification of the snap washer construction shown in Fig. 14, the circumferential outer portion 62 of the washer is substantially the same as those shown in Figs. 11 and 13. The outer surface of the prongs 63, 63a of each snap washer is tapered 64 as shown in Fig. 14, to reduce the pressure of the prongs 63, 63a against the drive pin while the pin is being inserted into the snap washer in the manner shown in Fig. 12, and to facilitate insertion of the prongs of the washer into the circular groove 61 around the drive pin in substantially the same manner as that shown in Fig. 10.

The operation of the drive pins relative to the driving and driven discs 15, 30 is substantially the same as that shown in Figs. 1 and 2, regardless of whether the drive pins are inserted in the manner shown in Fig. 7, or in that of the modified construction shown in Fig. 12.

The drive pins 23, 55 may be made of hardened steel, or other type of through hardened material, or the short gripping end of each drive pin, including the circular groove 26 and the portion of the drive pin 23, 55 between the circular groove 26 and the tip of the drive pin, or the tip portion of the drive pin alone, may be surface hardened, or otherwise surface treated to provide a smooth hard surface against the angular faces of the grooves 43, 43a in the driven plate.

The snap washer 25, shown in Figs. 8 and 9, and the modified snap washer 58 shown in Figs. 13 and 14 are made of a spring material which is heat treated to a spring temper to facilitate moving the prongs 37, 52 of the washer from their normal position shown in Figs. 9 and 13, to their displaced positions shown in Figs. 7 and 12.

The entire driven disc 30, or the flat ring section 42 of the driven disc, through which the grooves 43, 43a are cut, may be made of hardened steel, or other hardened material, or the flat ring face 42 of the driven disc, and the angular surfaces 45, 45a of each of the grooves 43, 43a in the driven disc may be surface hardened, or otherwise plated, coated or surface treated in order to reduce wear on the tip of the drive pin, and the flat angular surfaces of the grooves 43, 43a of the driven disc to a minimum, when the drive pins are in their operative positions, the tips 28, 28a of the drive pins being fitted into the grooves in the driven disc 30 in the driving position shown in Fig. 1, the modified drive pin 55 shown in Figs. 11 and 12, functioning in substantially the same manner.

If an excessive load, such as a serious obstruction to rotation is imposed on the driven shaft 14, particularly where the unit load on the tip 28 of each of the drive pins 23, 23a is greater than the load imposed on each of the drive pins 23, 23a by the compression spring 40, 40a fitted thereto, one sloping face 45, 45a of each of the grooves 43, 43a in the driven disc forces the tip 28 of the drive pin out of the mating groove into a position such as that shown in Fig. 2, in which all of the compression springs 40, 40a are compressed, the tips of the drive pins being in engagement with the flat ring face 42 of the driven disc.

As the rotation of the drive shaft 11, which is usually motor driven, is continuous, even though the driven disc 30 is held relatively stationary, the driving disc is rotated until the tip 28 of one of the drive pins drops into the adjoining radial groove 43, 43a of the driven disc, the driving disc having been rotated through approximately 90° from its initial position, in the construction shown in Figs. 1, 3 and 4.

The operation of the modified drive pins shown in Figs. 11 and 12, and the snap washers used in conjunction therewith, relative to the driving and driven discs 15, 30, is substantially the same as that shown in Figs. 1 and 2, and hereinbefore described.

In this, the driving position shown in Fig. 1, the compression springs 40, 40a again force the tips of the drive pins 23, 23a into the radial grooves 43, 43a in the driven disc, and the rotation of the driven disc continues in the manner hereinbefore described, unless the load on the individual drive pins imposed by the driven disc 30, is greater than the force of the compression spring 40, 40a, surrounding it, under which conditions the compression springs 40, 40a are again compressed and the drive pins forced outward into the free position shown in Fig. 2.

In order to reduce the rotational angular movement of the driving disc, when the drive pins are moved from one driving position, shown in Fig. 1, through the free position shown in Fig. 2, into the next driving position, similar to that shown in Figs. 1 and 5, or a total rotational angular movement of 90° for each step, a modified type of driven disc 65, may be substituted for the driven disc 30 shown in Fig. 3. In this construction, in addition to the four equally-spaced radial grooves 66, 66a, which are aligned with the axes of the grooves 43, 43a as shown in Figs. 1 and 5, an additional set of auxiliary radially positioned grooves 67, 67a is cut into the inner circular face 68 of the driven disc 65, so that the grooves 66, 67, are equally spaced around the circumference of the driven disc or approximately 45° apart, as shown in Fig. 15.

With this construction, the rotational angular movement of the driving disc from one driving position, in which the tips of the drive pins 23, 23a are in engagement with the auxiliary radial grooves 67, 67a of the driven disc, is equal to about 45°.

This enables the rotational angular movement of the driving disc to be stepped through only 45°, or one-half the angle of the driving disc shown in Fig. 3, in order to transfer the drive pins from one operating position to the next.

The driving disc 15 used in conjunction with this type of driven disc 66, has a substantially cylindrical hollow sleeve integral therewith, the tubular sleeve being fitted to the drive shaft and locked thereto by a plurality of radially positioned set screws 20, 20a or other suitable locking means, as shown in Figs. 2 and 4.

The clamping disc or pin support disc 17, which is parallel to the driving disc 15, is integral with the end of the tubular sleeve opposite the driving disc 15. This enables the entire driving unit, including the driving disc, the pin support disc, and the drive pins, the compression springs and snap washers fitted to the drive pins 23, 23a, to be moved laterally relative to the drive shaft 11 before the drive section is clamped to the drive shaft by the set screws 20, 20a.

The driving disc 15 may be made in one piece, with the tubular sleeve 16 and the pin support disc integral therewith as shown in Fig. 6, or the driving disc 15 may be made of a separate piece, the tubular sleeve having a reduced diameter cylindrical end section integral therewith, the reduced diameter cylindrical end section being fitted to an opening through the cylindrical driving disc 15.

In this construction, the end of the tubular sleeve section may be welded, brazed, or otherwise fixedly attached to the driving disc, the driving disc and the sleeve thereof functioning as an integral unit.

The tip of each of the drive pins 23, 23a, or of the modified drive pin 55, 55a, shown in Figs. 11 and 12, may be of hemi-spherical, or other arcuate cross-sectional contour, or of substantially frusto-conical form, with a small radius at the tip, the radius being larger than that at the root of each radial groove in the driven disc, depending upon the diameter of the drive pin and the width of the radial groove to which it is fitted.

The driven disc 30 may be made in one piece, of hardened steel, or other hardened material, or the flat face thereof and the faces of the radial grooves cut into the ring face thereof, may be surface hardened or hard metal plated in order to provide a hard working surface, and reduce wear on the angular faces of the grooves in the driven disc to a minimum.

Similarly, the drive pins 23, 23a, or the modified drive pins 55, 55a, and the tips 28, 28a thereof may be made of hardened steel, or other through hardened material, or surface hardened at the working surfaces thereof for substantially the same reason.

The number of drive pins used, the type of drive pins used, the type of snap washer used with each individual drive pin, the diameter of the individual drive pins, the size of the radial grooves in the driven disc used in conjunction therewith, and the included angle of the faces of such grooves, would vary with the load to be transmitted by the clutching mechanism, the diameter of the driving and the driven discs and the diametral spacing between the drive pins.

The type of snap washer employed and the width and depth of the circular groove in the drive pin used in conjunction therewith, would depend upon the type of prongs in the snap washer. The number and depth of the radial prongs formed in the individual snap washer, would depend upon the type and size of snap washer employed, the spring load imposed on the snap washer, and the load required against the grooves in the face of the driven disc. This would also apply to the method of insertion of the drive pins through the selected type of snap washer, as shown in Figs. 6 and 7, or 11 and 12.

It will be apparent to those skilled in the art that the present invention is not limited to the specific details described above and shown in the drawings, and that various modifications are possible in carrying out the features of the invention and the operation, actuation, and method of utilization thereof, without departing from the spirit and scope of the appended claims.

What is claimed is:

1. A clutching mechanism comprising a driving member attached to a rotatable drive shaft, a driven member co-axial with the driving member located adjacent one face thereof, a plurality of drive pins slidably fitted to the driving member, each of said drive pins being substantially perpendicular to the face of the driving member directed toward the driven member, one end of said drive pins normally projecting beyond the face of the driving member directed toward the driven member, spring means fitted to each of the drive pins, the driven member having means formed on one face thereof adapted to receive the projecting portion of the drive pins to transmit the rotation of the driving member to the driven member, the driving member including a driving disc located adjacent the driven member, a pin support disc co-axial with the driving disc integral with and spacedly located relative to the driving disc, the driving disc and pin support disc each having a plurality of radially positioned aligned openings therethrough to slidably support the drive pins, each drive pin having a substantially circular groove around the outer circumference thereof, near the driving disc, a relatively thin washer having a central opening therethrough, smaller than the outer diameter of the drive pins fitted to the circular groove around each drive pin, each of said washers being adapted to engage the spring means, the spring means being adapted to urge the projecting portion of the drive pin toward the driven member, each of said thin washers having a plurality of integral substantially radially positioned prongs directed toward the center thereof, the prongs being adapted to fit into the circular groove surrounding the mating drive pin to transmit the load of the spring means to the drive pin.

2. A clutching mechanism comprising a driving member attached to a rotatable drive shaft, a driven member co-axial with the driving member located adjacent one face thereof, a plurality of drive pins slidably fitted to the driving member, each of said drive pins being substantially perpendicular to the face of the driving member directed toward the driven member, one end of said drive pins normally projecting beyond the face of the driving member directed toward the driven member, the driven member having means formed in one face thereof adapted to receive the projecting portion of the drive pins to transmit the rotation of the driving member to the driven member, the driving member including a driving disc located adjacent the driven member, a pin support disc coaxial with the driving disc integral with and spacedly located relative to the driving disc, the driving disc and pin support disc each having a plurality of radially positioned aligned openings therethrough to slidably support the drive pins, each drive pin having a substantially circular groove around the outer circumference thereof, near one face of the driving disc, a coiled compression spring surrounding each drive pin, a relatively thin washer made of a spring material fitted to the circular groove around each drive pin, said washer having a central opening therethrough, smaller than the outer diameter of the drive pin, each of said thin washers having a plurality of integral substantially radially positioned prongs directed toward the center thereof, the prongs of the washer being adapted to fit into the circular groove around the drive pin, to transmit the load of the compression spring surrounding each drive pin to the drive pin, the compression spring being adapted to urge the projecting portion of the mating drive pin toward the driven member, the prongs of each spring washer being adapted to be angularly displaced relative to the face of the washer to enable the arcuate end of the drive pin to be manually forced through one of the spring washers, the prongs of the spring washer being adapted to engage the outer circumference of the drive pin when the drive pin is moved longitudinally relative to the spring washer, until the inner edge of the prongs of the spring washer is aligned with the circular groove around the drive pin.

3. A clutching mechanism comprising a driving member attached to a rotatable drive shaft, a driven member co-axial with the driving member located adjacent one face thereof, a plurality of drive pins slidably fitted to the driving member, each of said drive pins being substantially perpendicular to the face of the driving member directed toward the driven member, one end of said drive pins normally projecting beyond the face of the driving member directed toward the driven member, the driven member having means formed in one face thereof adapted to receive the projecting portion of the drive pins to transmit the rotation of the driving member to the driven member, the driving member including a driving disc located adjacent the driven member, a pin support disc co-axial with the driving disc integral with and spacedly located relative to the driving disc, the driving disc and pin support disc each having a plurality of radially positioned aligned openings therethrough to slidably support the drive pins, each of the drive pins having a substantially frusto-conical end thereon, at the end opposite the arcuate end, a coiled compression spring surrounding each drive pin, each drive pin having a substantially circular groove around the outer circumference thereof, near one face of the driving disc, a relatively thin washer made of a spring material fitted to the circular groove around each drive pin, adjacent the compression spring fitted to each drive pin, each of said washers having a central opening therethrough smaller than the outer diameter of the drive pin, each of said spring washers having a plurality of integral substantially radially positioned prongs directed toward the center thereof, the prongs of each spring washer being adapted to fit into the circular groove surrounding the mating drive pin, to transmit the longitudinal force of the compression spring surrounding the drive pin to the arcuate end of the drive pin, to urge the projecting portions of each drive pin toward the driven member.

4. A clutching mechanism comprising a driving member attached to a rotatable drive shaft, a driven member co-axial with the driving member located adjacent one face thereof, a plurality of drive pins slidably fitted to the driving member, each of said drive pins being substantially perpendicular to the face of the driving member directed toward the driven member, one end of said drive pins normally projecting beyond the face of the driving member directed toward the driven member, the driven member having means formed in one face thereof adapted to receive the projecting portion of the drive pins to transmit the rotation of the driving member to the driven member, the driving member including a driving disc located adjacent the driven member, a pin support disc co-axial with the driving disc integral with and spacedly located relative to the driving disc, the driving disc and pin support disc each having a plurality of radially positioned openings therethrough to slidably support the drive pins, each of the drive pins having a substantially frusto-conical end thereon, at the end opposite the arcuate end thereof, a coiled compression spring surrounding each drive pin, each drive pin having a substantially circular groove around the outer circumference thereof, near one face of the driving disc, a relatively thin washer made of a spring material, fitted to the circular groove around each drive pin, adjacent the coiled compression spring fitted to the drive pin, each of said washers having a central opening therethrough, smaller than the outer circumference of the drive pin, each of said spring washers having a plurality of spacedly located radially positioned prongs integral therewith directed toward the center thereof, the frusto-conical end of each drive pin being adapted to be pressed through the central opening through the corresponding spring washer, thereby to angularly displace the prongs thereof, the displaced prongs being adapted to engage the outer circumferential surface of the drive pin, the central ends of the prongs being adapted to fit into the circular groove around the mating drive pin, thereby to transmit the longitudinal force of the compression spring surrounding each drive pin to the drive pin, to normally urge the projecting portion of each drive pin toward the driven member.

5. A clutching mechanism comprising a driving member attached to a rotatable shaft, said driving member including a substantially circular driving disc at one end thereof, a tubular sleeve section integral with the driving disc extending outward therefrom, coaxially therewith, a pin support disc integral with the tubular sleeve, spacedly located relative to the driving disc and substantially parallel thereto, a driven member co-axial with the driving member located adjacent the outer face of the driving disc, a plurality of drive pins, substantially parallel to the longitudinal axis of the driving member, slidably fitted to each pair of aligned openings through the driving disc and the pin support disc, a coiled compression spring surrounding each of said drive pins, the tip of the projecting portion of each drive pin being of arcuate cross-sectional contour, the driven member having means formed in the face thereof directed toward the driving disc, to receive the arcuate projecting tips of the drive pins to transmit the rotation of the driving member to the driven member, each drive pin having a substantially circular groove around the outer circumference thereof, near the driving disc, a relatively thin washer made of a spring material fitted to each drive pin, each of said spring washers having a central opening therethrough, smaller than the outer diameter of the drive pin, each of said spring washers having a plurality of integral, spaced, radially positioned prongs directed toward the center thereof, the cross-section of one face of each of said prongs being sloped relative to the opposite face thereof, to facilitate angularly displacing the prongs of the spring washer while the drive pin is being pressed into the mating spring washer, the circular groove around each drive pin being adapted to receive the inner portion of the prongs of the mating spring washer, to transmit the pressure of the compression spring to the drive pin, thereby to normally urge the projecting portion of each drive pin toward the driven member.

6. A clutching mechanism comprising a driving member attached to a rotatable drive shaft, a driven member co-axial with the driving member located adjacent one face thereof, a plurality of drive pins slidably fitted to the driving member, each of said drive pins being substantially perpendicular to the face of the driving member directed toward the driven member, one end of said drive pins normally projecting beyond the face of the driving member directed toward the driven member, the driven member having means formed in one face thereof adapted to receive the projecting portion of the drive pins to transmit the rotation of the driving member to the driven member, the driving member including a driving disc located adjacent the driven member, a pin support disc co-axial with the driving disc integral with and spacedly located relative to the driving disc, the driving disc and pin support disc each having a plurality of radially positioned aligned openings therethrough to slidably support the drive pins, each of the drive pins having a substantially circular groove around the outer circumference thereof, near one face of the driving disc, a relatively thin washer made of a spring material fitted to the circular groove around each drive pin, the cross-section of the outer portion of each spring washer being sloped relative to a plane perpendicular to the longitudinal axis of the drive pin, each of said spring washers having a central opening therethrough of a diameter smaller than the outer diameter of the drive pin, each of said spring washers having a plurality of spacedly located radially positioned prongs integral therewith, directed toward the center thereof, the cross-section of the prongs being sloped relative to a plane perpendicular to the longitudinal axis of the drive pin, the central portion of the prongs being adapted to fit into the circular groove around the outer circumference of the drive pin when the circular groove of the drive pin is aligned with the prongs of the mating spring washer, thereby to transmit the longitudinal force of the spring means to the drive pin and force the tip of the drive pin into engagement with the corresponding radial groove in the driven disc.

7. A clutching mechanism comprising a driving member of substantially circular form fitted to a rotatable drive shaft, a driven member co-axial with the driving member located adjacent one face thereof, a plurality of drive pins slidably fitted to the driving member, substantially parallel to the longitudinal axis thereof, one end of each of said drive pins normally projecting beyond the face of the driving member directed toward the driven member, spring means adapted to normally urge the drive pins toward the driven member, the end of each of the drive pins directed toward the driven member being of arcuate cross-sectional contour, the driven member having a plurality of substantially radially positioned grooves in the face thereof directed toward the driving member, the angular spacing between said grooves being substantially equal to the angular spacing between the drive pins, said grooves being adapted to receive the arcuate ends of the drive pins to transmit the rotation of the driving member to the driven member, said grooves being adapted to enable the drive pins to slip to a limited degree against the pressure of the spring means, to enable the driving member to rotate while, the driven member is held substantially stationary, each drive pin having a substantially circular groove around the outer circumference thereof, near the driving disc, a relatively thin washer having a central opening therethrough, smaller than the outer diameter of the drive pins, removably fitted to each of the drive pins, each of said thin washers having a plurality of integral substantially radially positioned prongs directed toward the center thereof, the prongs being adapted to fit into the circular groove surrounding the mating drive pin to transmit the load of the spring means to the drive pin, to normally urge the drive pins toward the driven member.

8. A clutching mechanism comprising a driving member attached to a rotatable drive shaft, a driven member co-axial with the driving member located adjacent one face thereof, a plurality of drive pins slidably fitted to the driving member, each of said drive pins being substantially perpendicular to the face of the driving member directed toward the driven member, one end of said drive pins normally projecting beyond the face of the driving member directed toward the driven member, spring means fitted to each of the drive pins, the ends of each drive pin directed toward the driven member being of arcuate cross-sectional contour, the driven member having a plurality of radially positioned grooves in the face thereof directed toward the driving member, the grooves being radially aligned with the drive pins, said grooves being adapted to receive the arcuate end of the drive pins to transmit the rotation of the driving member to the driven member, the cross-sectional contour of each of said grooves allowing each groove to force the arcuate end of the corresponding drive pin out of the groove against the flat face of the driven member, thereby to permit free rotation of the driving member relative to the driven member, when the rotation of the driven member is retarded, each drive pin having substantially circular groove around the outer circumference thereof, near the driving disc, each drive pin having a relatively thin washer fitted thereto, each washer having a central opening therethrough, smaller than the outer diameter of the drive pins, each of said thin washers having a plurality of integral substantially radially positioned prongs directed toward the center thereof, the prongs being adapted to fit into the circular groove surrounding the mating drive pin to transmit the load of the spring means to the drive pin.

9. A clutching mechanism comprising a driving member attached to a rotatable shaft, said driving member including a substantially circular driving disc at one end thereof, a tubular sleeve section integral with the driving disc extending outward therefrom, coaxially therewith, a pin support disc integral with the tubular sleeve, spacedly located relative to the driving disc and substantially parallel thereto, the driving disc and the pin support disc each having a plurality of radially positioned aligned openings therethrough, a driven member coaxial with the driving member located adjacent the outer face of the driving disc, a plurality of drive pins, substantially parallel to the longitudinal axis of the driving member, slidably fitted to each pair of aligned openings through the driving disc and the pin support disc, a coiled compression spring surrounding each of said drive pins, the tip of the projecting portion of each drive pin being of arcuate cross-sectional contour, means formed in the driven disc adapted to receive the arcuate tips of the drive pins, said means consisting of a plurality of radially positioned grooves of V-cross-section formed in the face of the driven disc directed toward the driving disc, the angularly positioned faces of each of said radial grooves being adapted to receive the arcuate tip of one of the drive pins to transmit the rotation of the driving disc to the driven member, said grooves being adapted to move the arcuate tips of the drive pins toward the driving disc against the pressure of the compression springs, out of engagement with the grooves, when the rotation of the driven disc is retarded, each drive pin having a substantially circular groove around the outer circumference thereof, near one face of the driving disc, a relatively thin washer made of a spring material fitted to each drive pin, said washer having a central opening therethrough smaller than the outer diameter of the drive pin, each of said spring washers having a plurality of integral substantially radially positioned prongs directed toward the center thereof, the prongs of the spring washer being adapted to fit into the circular groove surrounding each drive pin, to transmit the longitudinal force of the compression spring surrounding the drive pin to the arcuate end of the drive pin.

10. A clutching mechanism comprising a driving member attached to a rotatable shaft, said driving member including a substantially circular driving disc at one end thereof, a tubular sleeve section integral with the driving disc extending outward therefrom, coaxially therewith, a pin support disc integral with the tubular sleeve, spacedly located relative to the driving disc and substantially parallel thereto, the driving disc and the pin support disc each having a plurality of radially positioned aligned openings therethrough, a driven member coaxial with the driving member located adjacent the outer face of the driving disc, a plurality of drive pins, substantially parallel to the longitudinal axis of the driving member, slidably fitted to each pair of aligned openings through the driving disc and the pin support disc, a coiled compression spring surrounding each of said drive pins, the tip of the projecting portion of each drive pin being of arcuate cross-sectional contour, the driven member having a plurality of radially positioned grooves of V-cross-section formed in the face thereof directed toward the driving disc, the angularly positioned faces of each of said grooves being adapted to receive the arcuate tip of one of the drive pins to transmit the rotation of the driving disc to the driven member, each drive pin having a substantially circular groove around the outer circumference thereof, near the driving disc, a relatively thin washer made of a spring material removably fitted to each of the drive pins, each of said spring washers having a central opening therethrough, smaller than the outer diameter of the drive pins, each of said spring washers having a plurality of integral, spaced, radially positioned prongs directed toward the center thereof, the cross-section of one face of each of said prongs being sloped relative to the opposite face thereof, to facilitate angularly displacing the prongs of the spring washer while the drive pin is being pressed into the mating spring washer, the circular groove around each drive pin being adapted to receive the inner portion of the prongs of the mating spring washer, to transmit the pressure of the compression spring to the drive pin.

References Cited in the file of this patent

UNITED STATES PATENTS

| | | |
|---|---|---|
| 461,813 | Cahow | Oct. 27, 1891 |
| 2,443,213 | Weber | June 15, 1948 |